July 16, 1957     A. L. MADUNICH     2,799,180
MOTOR VEHICLE STEERING MECHANISM
Filed Dec. 14, 1954     2 Sheets-Sheet 1

INVENTOR
ANTHONY L. MADUNICH

BY
McMorrow, Berman & Davidson
ATTORNEYS

July 16, 1957 A. L. MADUNICH 2,799,180
MOTOR VEHICLE STEERING MECHANISM
Filed Dec. 14, 1954 2 Sheets-Sheet 2
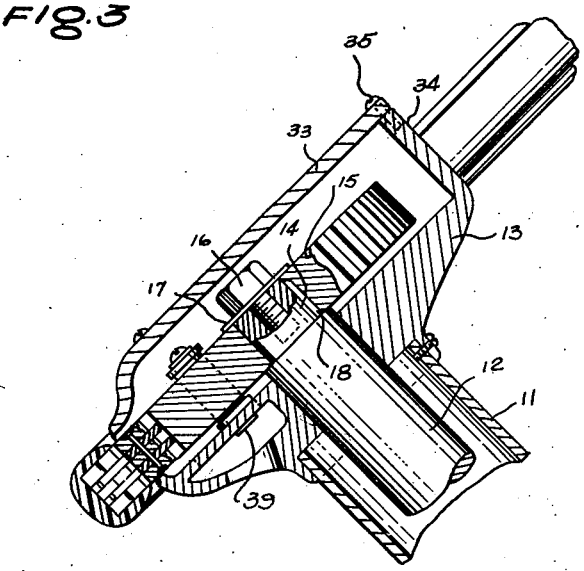
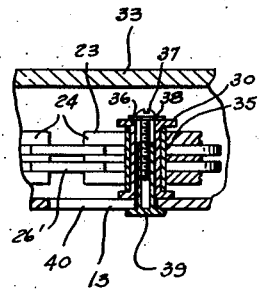
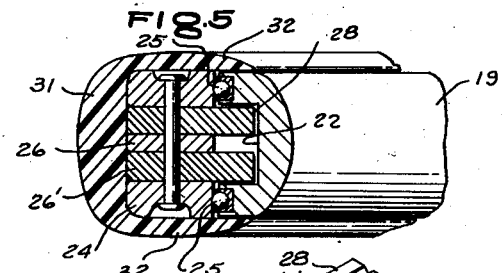
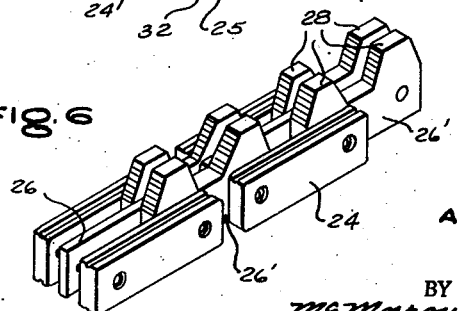
INVENTOR
ANTHONY L. MADUNICH
BY
McMorrow, Berman & Davidson
ATTORNEYS

United States Patent Office 2,799,180
Patented July 16, 1957

2,799,180

MOTOR VEHICLE STEERING MECHANISM

Anthony L. Madunich, Thief River Falls, Minn.

Application December 14, 1954, Serial No. 475,020

3 Claims. (Cl. 74—501)

This invention relates to steering apparatus for motor vehicles, and more particularly to an improved steering mechanism for an automobile.

The main object of the invention is to provide a novel and improved steering mechanism for a motor vehicle wherein the lower half of the steering wheel customarily employed on a motor vehicle is eliminated, the mechanism occupying the space taken by the upper half of the conventional steering wheel, whereby additional space is provided for the driver of the vehicle.

A further object of the invention is to provide an improved steering mechanism for a motor vehicle which is simple in construction, which involves only a few parts, which is durable, and which is reliable in operation.

A still further object of the invention is to provide an improved steering mechanism for an automobile which is compact in size but which is arranged so that the operator of the vehicle has complete control of the steering elements of the vehicle.

Further objects and advantages of the invention will become apparent from the following description and claims, and from the accompanying drawings, wherein:

Figure 3 is an enlarged transverse vertical cross sectional view taken on the line 3—3 of Figure 2.

Figure 4 is an enlarged cross sectional detail view taken on the line 4—4 of Figure 2.

Figure 5 is an enlarged cross sectional detail view taken on the line 5—5 of Figure 2.

Figure 6 is an enlarged perspective view of a portion of the sprocket chain employed in the steering mechanism of Figures 1 to 5.

Figure 1:
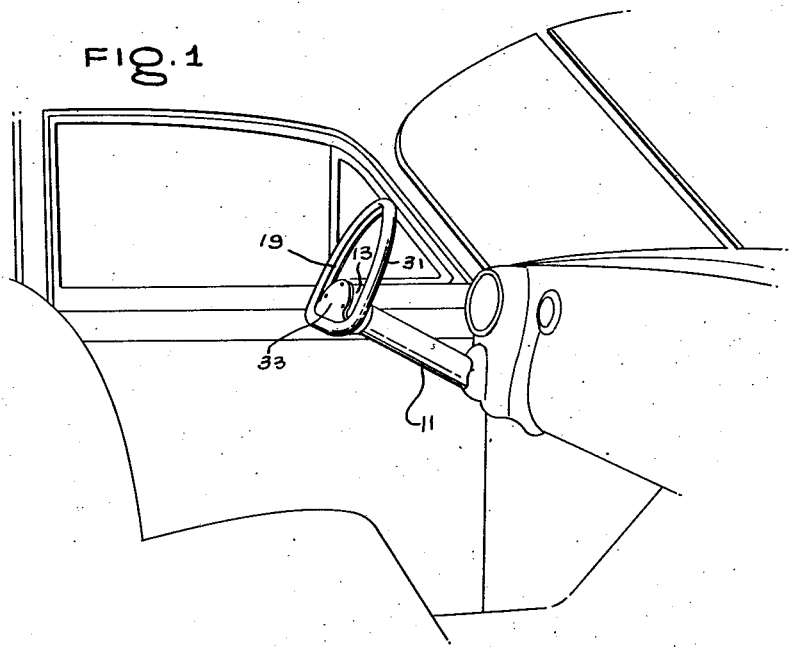
Figure 1 is a perspective view of a portion of the interior of a motor vehicle showing an improved steering mechanism according to the present invention installed on the steering post of the vehicle.

Referring to the drawings, 11 designates the hollow steering post of a motor vehicle, said steering post containing the usual steering shaft 12 which is suitably journaled in the post. Secured to the top end of the hollow steering post 11 is the housing 13, the upper portion of the shaft 12 extending rotatably through the bottom wall of the housing, as is clearly shown in Figure 3. The top end of the shaft 12 is reduced in diameter, as shown at 14, and secured on said reduced portion 14 is the gear wheel 15. The gear wheel 15 is rigidly secured to the top end of the steering shaft 12 in any suitable manner, for example, by means of a clamping bolt 16 threaded into the end of the reduced portion 14 and clampingly engaging a washer 17, which in turn clampingly engages the gear 15, said gear being secured against rotation on the reduced shaft portion 14 by a suitable key 18.

Integrally formed with the housing 13 is a frame 19, said frame having the horizontally extending side portions 20, 20 which merge with the semicircular upper portion 21, the upper portion 21 being substantially in the position of the upper half of the conventional steering wheel employed on vehicles of the prior art.

The frame 19 is formed around its periphery with the outwardly facing channel or groove 22, and slidably engaged in said groove 22 is an endless articulated belt 23, said belt comprising articulated links 24, the outer edges of the frame being provided with the ball bearings 25 engaging the edges of the articulated links 24, as shown in Figure 5.

As shown in Figures 5 and 6, the endless belt includes the inner articulated link elements 26 which are pivotally connected parallel to the main articulated links 24. Link elements 26' are disposed between the links 26 and the outside links 24 and connect adjacent elements 26 and outside links 24, the link elements 26' being formed with the sprocket teeth 28 which are directed inwardly and which are received in the channel 22.

Figure 2:
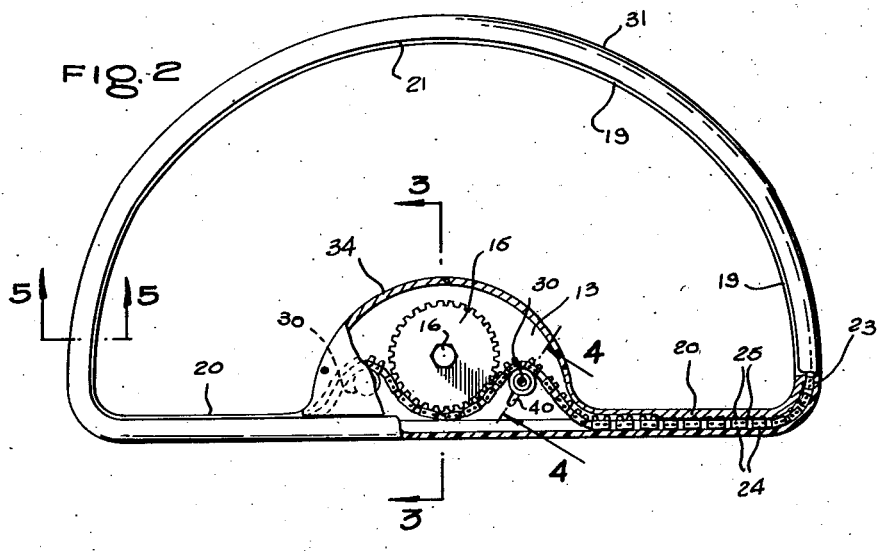
Figure 2 is a top plan view, partly in horizontal cross section, of the improved steering mechanism of Figure 1.

Respective idler sprocket wheels 30, 30 are mounted on the bottom wall of the housing 13 for free rotation, said idler sprocket wheels 30 being located adjacent the respective sides of the main gear wheel 15 and being arranged to support the belt 23 and the sprocket teeth 28 thereon in engagement with the lower portion of the gear wheel 15, as shown in Figure 2. Thus, the belt 23 is looped over the respective idler sprockets 30, and the intervening portion of the belt, carrying the sprocket tooth elements 28, is thus held in engagement with the lower peripheral portion of the gear wheel.

Frictionally secured on the articulated endless belt 23 is the endless cover element 31 of flexible deformable material, such as rubber, or the like, which is engaged over the belt and which overlies the respective side surfaces of the frame 19 adjacent to the belt, as is clearly shown in Figure 5. Thus, the cover 31 is channel-shaped in transverse cross section, and the respective side walls 32, 32 of the cover are of sufficient length to overlap the respective side surfaces of the frame 19. The cover 31 is engaged on the belt with sufficient tension to assure secure frictional interengagement with the major portion of the belt, only that portion of the belt located in the housing 13 being out of engagement with the interior surfaces of the cover 31, as shown in Figure 2.

As shown in Figure 5, the overlapping portions of the side walls 32, 32 of the cover 31 are spaced sufficiently from the side surfaces of the frame 19 to allow free movement of the cover relative to the frame 19, whereby the belt 23 may be moved along the frame by exerting steering force on the cover 31.

In operation, the driver of the vehicle moves the cover 31 along the frame 19 in one direction or the other, depending upon the direction in which the vehicle is to be steered, the movement of the cover 31 being transmitted by the belt 24 and the sprocket teeth 28 thereon to the gear wheel 15, whereby the steering shaft 12 is rotated.

As will be readily apparent from Figure 1, the lower space formerly occupied by the lower half of the steering wheel in the conventional type of steering mechanism is made available to the driver, making it easier for the driver to move into his seat and to leave his seat, and providing increased leg room for the driver.

The housing 13 is provided with the removable top cover 33 which is secured to the edge of the outer wall 34 of the housing, as by suitable screws 35. Thus, access to the interior of the housing 13 may be had when desired by merely removing the top cover 33.

As shown in Figure 4, the sprocket idlers 30 may comprise sleeve elements 35 rotatably mounted on flanged tubular sleeves 36, said sleeves being adjustably secured to the bottom wall of the housing 13 by respective bolts 37 passing through washers 38, the bolts engaging in the bore of the sleeves 36 and being threadedly engaged with headed tubular sleeve nuts 39 engaged from below through respective slots 40 formed in the bottom wall of the housing 13 and extending into the bores of the sleeves 36. As shown in Figure 2, the slots 40 are inclined downwardly and inwardly toward the lower peripheral portion of the gear wheel 15, whereby the sprocket idler roller members 30 may be adjusted to provide a desired tension in the belt adjacent the gear wheel 15. As illustrated in Figure 4, the lower edge of the belt engages on the rotatable sleeve elements 35, said sleeve elements being freely rotatable, whereby the belt is suitably supported so that the sprocket teeth 28 mesh properly with the teeth of the gear wheel 15.

While a specific embodiment of an improved steering arrangement for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a steering post, a steering shaft journaled in said post, a frame rigidly secured to the top portion of said post, said frame having a substantially horizontally extending lower portion and an arcuate upper portion connecting the ends of said lower portion, resembling the upper portion of a steering wheel, a gear wheel secured on the top end of said shaft, and an articulated endless sprocket chain slidably mounted on said frame for movement therearound, said chain being in meshing engagement with said gear wheel, whereby said steering shaft is rotated responsive to movement of said chain.

2. In a motor vehicle, a steering post, a steering shaft journaled in said post, a housing secured to the top portion of said post and surrounding the top end of said shaft, a frame rigidly secured to said housing, said frame having a substantially horizontally extending lower portion and an arcuate upper portion connecting the ends of said lower portion, resembling the upper portion of a steering wheel, a gear wheel in said housing secured on the top end of said shaft, and an endless chain slidably mounted on said frame for movement therearound, said chain passing through said housing and having sprocket teeth in meshing engagement with said gear wheel, whereby said steering shaft is rotated responsive to movement of said chain.

3. In a motor vehicle, a steering post, a steering shaft journaled in said post, a housing secured to the top portion of said post and surrounding the top end of said shaft, a frame rigidly secured to said housing, said frame having a substantially horizontally extending lower portion and an arcuate upper portion connecting the ends of said lower portion, resembling the upper portion of a steering wheel, a gear wheel in said housing secured on the top end of said shaft, an endless chain slidably mounted on said frame for movement therearound, said chain passing through said housing and having sprocket teeth, said frame being formed with an outwardly facing guide channel receiving said chain, a cover element of deformable resilient material frictionally engaged on said chain and extending around the frame and said housing, and a pair of idler sprocket wheels journaled in said housing on opposite sides of said gear wheel and supporting said sprocket teeth in meshing engagement with the gear wheel, whereby said steering shaft is rotated responsive to movement of said chain.

References Cited in the file of this patent
UNITED STATES PATENTS

| | | |
|---|---|---|
| 1,476,347 | Martin | Dec. 4, 1923 |
| 2,442,288 | Floria | May 25, 1948 |
| 2,741,133 | Barski | Apr. 10, 1956 |